Oct. 29, 1935.  H. D. CHURCH  2,018,834
CLUTCH
Filed Oct. 19, 1931  2 Sheets-Sheet 2

Inventor
HAROLD D. CHURCH
By Richey & Watts
Attorneys

Patented Oct. 29, 1935

2,018,834

UNITED STATES PATENT OFFICE 2,018,834

CLUTCH

Harold D. Church, Cleveland Heights, Ohio, assignor to The White Motor Company, Cleveland, Ohio, a corporation of Ohio Application October 19, 1931, Serial No. 569,598

9 Claims. (Cl. 192—69)

This invention relates to friction clutches, particularly to clutches for coupling the engine and transmission of a motor vehicle.

One object of this invention is to provide an improved arrangement for effecting the engagement and disengagement of the friction elements of a clutch of the multiple disc type.

Another object is to construct a clutch in such a manner as to permit adjustment throughout the life of the clutch facings to compensate for wear of the facings without changing the original relation of the operating elements, and without changing the force pressing the clutch elements into engagement.

More specifically, this invention consists of a novel combination of elements for securing full frictional engagement under maximum pressure on both faces of each of a plurality of friction discs, and for engaging and disengaging all friction surfaces simultaneously. Other objects are to insure a uniform distribution of the torque load throughout all parts of a plurality of engaging surfaces; to maintain one or more floating members equally spaced from a pair of relatively movable members during engagement or disengagement; and to free a floating member from friction discs on opposite sides thereof when the two relatively movable members are separated. Other objects relating to details of construction and economies of manufacture will appear hereinafter.

In the accompanying drawings which illustrate a preferred embodiment of the invention:

Figure 3 is a section taken on the line 3—3 of Figure 2;

Figure 1:
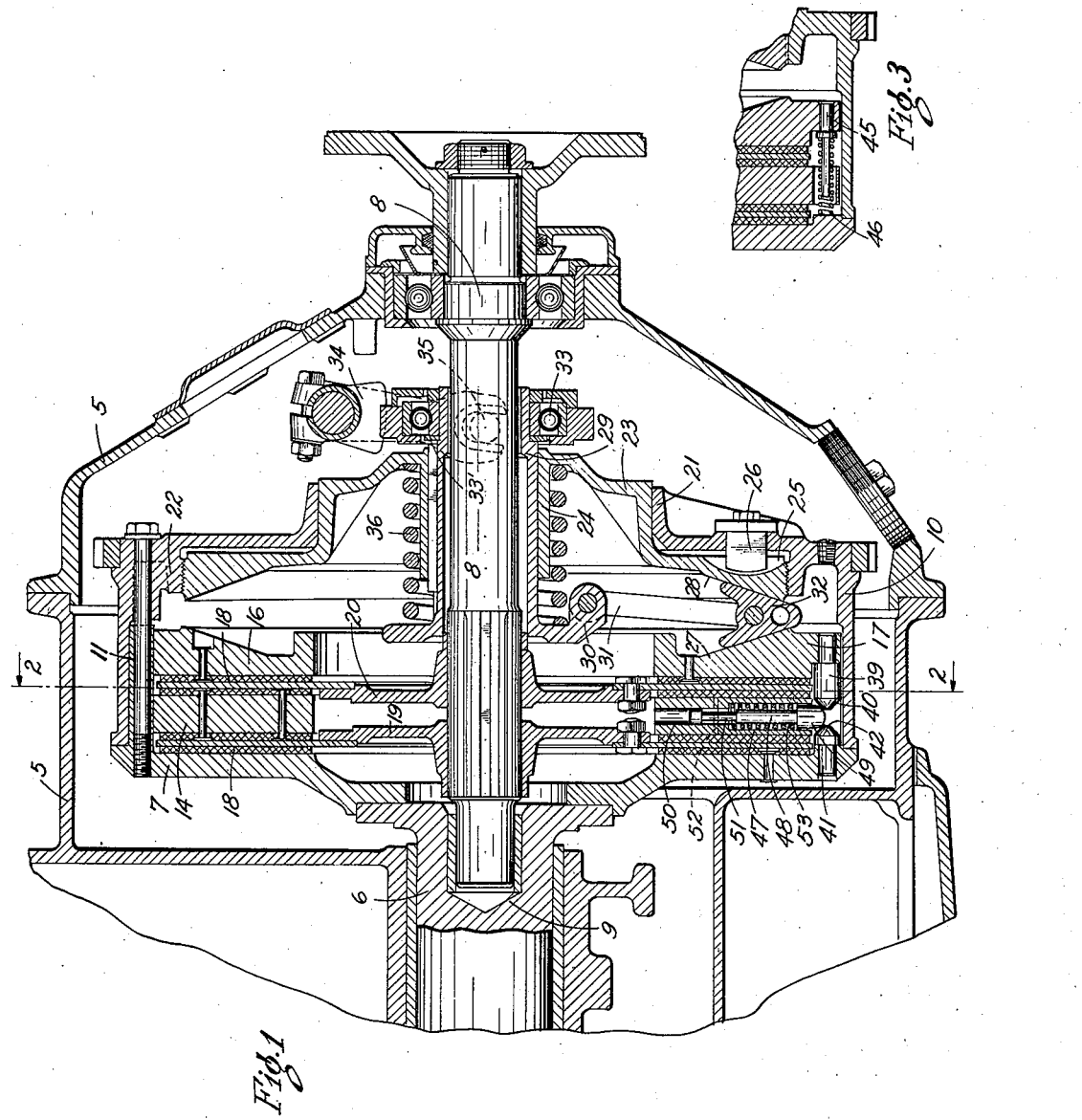
Figure 1 is a vertical sectional view taken through a clutch constructed in accordance with this invention.
Figure 2:
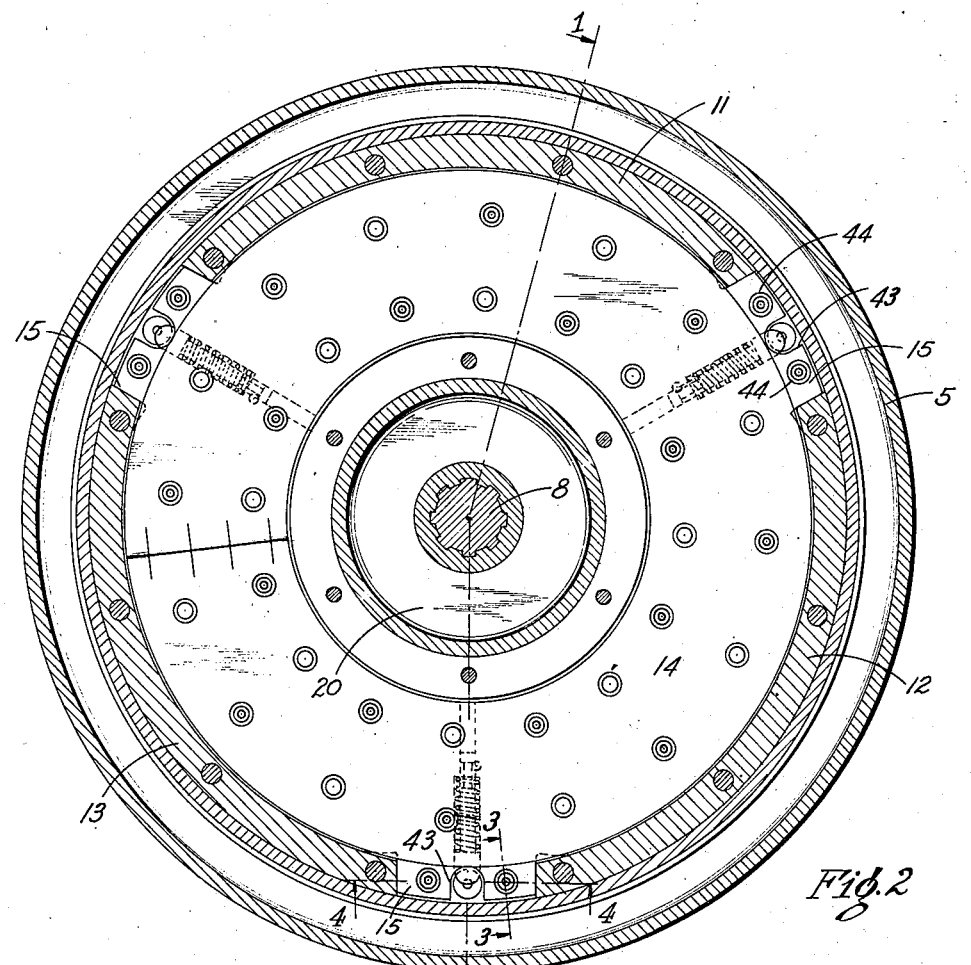
Figure 2 is a sectional view taken on a plane indicated by the line 2—2 of Figure 1, looking in the direction of the arrows.
Figure 4:
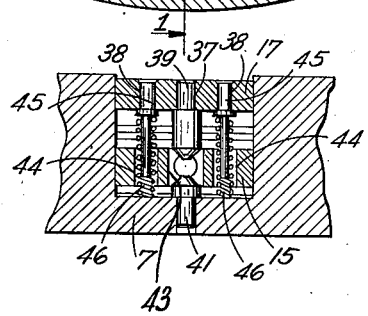
Figure 4 is a section taken on the line 4—4 of Figure 2.

Referring to the drawings the numeral 5 designates the fly wheel housing of a motor vehicle. A power shaft 6 arranged to receive the power of the engine extends into the fly wheel housing 5 and terminates in a fly wheel 7. A driven shaft 8 disposed rearwardly of, and in axial alignment with, the power shaft 6, is journalled in the housing 5 and has its forward end bearing in a recess 9 in the rearward end of the power shaft 6. A casing 10 is secured to the rear face of the fly wheel 7 and encloses the clutch mechanism for selectively coupling the two shafts 6 and 8.

The fly wheel 7 is provided with a plurality of spaced segmental flanges or lugs 11, 12 and 13 projecting rearwardly therefrom and fitting within the annular wall of the casing 10. A central ring 14 is mounted within the casing 10 and is formed with spaced lugs 15 fitting between the ends of the flanges 11, 12 and 13 and extending radially outward substantially to the inner surface of the annular wall of the casing 10. The periphery of the ring 14 intermediate the lugs 15 slidably engages the inner surfaces of the flanges 11, 12 and 13 to center the ring 14 with respect to the fly wheel 7 and the casing 10. An outer ring 16 is slidably mounted in the same manner within the casing 10 and is formed with lugs 17 engaging between the ends of the flanges 11, 12 and 13. Clutch facing 18 of any suitable type is secured to the rear face of the fly wheel 7, to both faces of the ring 14, and to the forward face of the ring 16. A pair of driving discs 19 and 20 are slidably splined to the shaft 8. The disc 19 is disposed between the rear face of the fly wheel 7 and the ring 14, and the disc 20 is disposed between the rings 14 and 16. The rings 14 and 16 are caused to rotate with the fly wheel 7 and power shaft 6 by reason of the engagement of their lugs 15 and 17 between the ends of the flanges 11, 12 and 13. When the rings 14 and 16 are pressed forwardly the discs 19 and 20 are gripped between the friction surfaces of the clutch facings 18, and rotation of the shaft 6 is imparted to the shaft 8.

The rear wall of the casing 10 is provided with a relatively large opening surrounded by a rearwardly extending flange 21 and is also formed with a short, forwardly extending, internally threaded flange 22. An abutment plate 23 has its periphery in screw threaded engagement with the flange 22, to permit adjustment of the plate 23 to compensate for wear of the facing 18, and slidably fits within the flange 21. This plate 23 is formed with a central opening surrounded by a forwardly extending cylindrical flange 24 which is spaced about the shaft 8. The outer surface of the plate 23 is formed with a series of notches 25 arranged to receive a lock 26 carried by the rear wall of the casing 10 which locks the plate 23 against rotation with respect to the casing 10.

The lock 26 consists of a plate bolted to the outer side of the rear wall of the casing 10 and carrying a flat projecting tongue which engages in any desired one of the notches 25. The tongue of the lock 26 projects through a hole in the rear wall of the casing 10 which is ordinarily of sufficient size to permit manual manipulation of the abutment plate upon removal of the lock 26. Any other suitable type of locking means may be employed if desired.

A suitable mechanism is provided to exert a releasable pressure on the slidable rings 14 and 16 to effect a gripping engagement between these rings and the discs 19 and 20.

The rear face of the ring 16 is formed with an inclined wedging surface 27 and the forward face of the plate 23 is formed with a complemental wedging surface 28. A sleeve 29 spaced about the shaft 8 slidably fits within the cylindrical flange 24 and is keyed thereto. The forward end of the sleeve 29 is formed with a flange 30 which pivotally carries a plurality of spaced links 31. A wedge 32 is pivoted to the outer end of each of the links 31 and is disposed between the inclined surfaces 27 and 28 so that movement of the wedges 32 radially outward forces the surfaces 27 and 28 apart. The rear end of the sleeve 29 projects past the plate 23 and carries a thrust bearing 33 and a thrust washer 33'. The latter is normally spaced rearwardly a short distance from the plate 23 and abuts the plate 23 and acts as a stop to prevent the links 31 passing dead center when the clutch facings wear sufficiently to absorb the normal clearance.

A yoke 34 arranged to be rocked in the usual manner by a foot pedal (not shown) engages pins 35 carried by the thrust bearing 33 to slide the sleeve 29 rearwardly through the cylindrical flange 24 to release the clutch. The sleeve 29 is normally retained in its forward position by a spring 36 which engages at its ends the flange 30 on the sleeve 29, and the plate 23. The force of the spring 36 is transmitted by the toggle links 31 and the wedges 32 to the surfaces 27 and 28 of the ring 16 and the member 23, and acts to press the ring 16, the ring 14, and the intermediate discs 19 and 20 forwardly toward the flywheel 7 to grip the discs 19 and 20 between the rings 14 and 16.

To effect simultaneous engagement and disengagement of all the friction surfaces and to thereby insure uniform wear, means are provided to maintain the ring 14 centered between the ring 16 and the fly wheel 7. Each of the lugs 17 on the outer ring 16 is formed with a central aperture 37 and two apertures 38 spaced on opposite sides thereof. The apertures 37 receive and rigidly support pins 39 which project forwardly from the ring 16 and terminate in conical heads 40. The fly wheel 7 carries pins 41 projecting toward and in axial alignment with each of the pins 39. Each pin 41 terminates in a conical head 42 similar to the conical heads 40. The lugs 15 on the central ring 14 are formed with notches 43 in alignment with the pins 39 and 41, and apertures 44 in alignment with the apertures 38.

Guide pins 45 are rigidly mounted in the apertures 38 in the lugs 17, and project through the apertures 44. Springs 46 surround the pins 45 and extend through the apertures 44 into engagement with the fly wheel 7 to normally urge the outer ring 16 away from the fly wheel 7. The central ring 14 is formed with a series of radial bores 47 opening into the notches 43. A pin 48 having an enlarged semi-spherical head 49 engaging the respective conical heads 40 and 42 is slidably disposed in each radial bore 47. Each bore 47 is formed with a reduced counterbore 50 extending inwardly through the inner periphery of the ring 14 and slidably receiving the inner end of the respective pin 48. Each pin 48 is formed near its inner end with a circumferential groove 51, and a locking pin 52 passing through the ring and intersecting each counterbore 50 extends into the groove 51 to limit the radial movement of the pin 48. Compression springs 53 surround the pins 48 and engage the enlarged heads 49 and the shoulders formed at the intersections of the bores 47 and the counter-bores 50 and normally urge the pins 48 radially outward to the limit of the movement permitted by the locking pins 52.

To release the clutch, pressure is exerted on the foot pedal (not shown) to cause the yoke 34 to rock and draw the sleeve 29 rearwardly against the force of the spring 36. This movement of the sleeve 29 draws the wedges 32 radially inward by reason of the links 31, permitting the wedging surfaces 27 and 28 to approach each other. The compression springs 53 press the semi-spherical heads 49 of the pins 48 against the opposed conical heads 40 and 42 of the pins 39 and 41 carried by the outer ring 16 and the fly wheel 7 respectively. This pressure tends to maintain the central ring 14 centered between the fly wheel 7 and the outer ring 16 and therefore, as the wedges 32 are retracted, tends to move the central ring 14 away from the fly wheel 7 and the outer ring 16 away from the central ring 14 at the same rate. As a consequence the discs 19 and 20 are freed from the pressure exerted on the opposite sides thereof simultaneously, it being understood that the disc 20 may slide upon the shaft 8 to compensate for the movement of the central ring 14. The springs 46 assist in moving the outer ring 16 away from the fly wheel 7 so that the springs 53 need only move the central ring 14, and may be made light enough to prevent any possibility of jamming when the clutch is re-engaged.

It will be understood that the springs 46 may be omitted if desired, and the springs 53 made sufficiently strong to spread the outer and central rings from the fly wheel.

To re-engage the clutch, the pressure is released from the foot pedal allowing the sleeve 29 to move forwardly under the influence of the spring 36. The resulting outward movement of the wedges 32 forces the outer ring 16 toward the fly wheel 7 and the engagement of the conical heads 40 and 42 with the heads 49 of the pins 48 forces the pins 48 to slide inwardly against the pressure of the springs 53. As a consequence the central ring 14 is again maintained centered between the fly wheel 7 and the outer ring 16 so that the clutching surface on the outer ring 16 approaches the adjacent surface of the central ring 14 at the same rate that the cooperating surfaces on the central ring 14 and the fly wheel 7 approach each other. The two discs 19 and 20 are, therefore, simultaneously engaged on their opposite sides with an increasing pressure so that the driving force from the shaft 6 is transmitted uniformly to the discs 19 and 20 and thence to the driven shaft 8. Since the pressure on the opposite sides of the two driving discs 19 and 20 is uniform at all times throughout the engagement and disengagement of the clutch, the wear on each of the clutch facings 18 will be uniform and the load will at all times be equally divided between the two discs. For this reason the clutch at all times will carry, without slipping, twice the load that could be carried by a single disc clutch.

The force of the spring 36 as applied to the wedges 32 is multiplied by the toggle action of the links 31 and also by the wedging action of the wedges acting upon the surfaces 27 and 28. As the links 31 approach positions at right angles to the line of action of the spring 36 the force urging the wedges 32 outwardly approaches an infinite value. Accordingly, the elements of the clutch are arranged in such a manner that the angle between the links 31 and the axis of the spring 36 is but slightly less than a right angle when the clutch is fully engaged. It will be evident, however, that slight wear of the clutch facings 18 which will permit the wedging surface 27 to move a slightly increased distance away from the surface 28, will permit a relatively great movement of the sleeve 29 beyond the original limit of its movement when the clutch is fully engaged. Movement of the sleeve 29 forwardly past the dead center of the links 31 is prevented by the thrust ring 33' which engages the plate 23. Since the clutch facings 18 wear but slightly, an original clearance between the plate 23 and the thrust ring 33' of about $\tfrac{1}{16}''$ is sufficient to take care of the wear during normal operation of the clutch for a considerable period of time. When this clearance has disappeared, however, and the thrust ring 33' engages the plate 23, thereby preventing the application of the full force of the spring 36 to the links 31, the clutch begins to slip and it is necessary to adjust the plate 23. This adjustment is permitted by the screw threaded engagement of the plate 23 within the flange 22, so that by releasing the lock 26 the plate 23 can be screwed forwardly a short distance and again locked. This adjustment of the plate 23 moves the surface 28 to its original spaced relation with the surface 27 and also moves the outer abutment of the spring 36 and the stop for the thrust washer 33' forwardly the same amount. Accordingly, when the plate 23 is adjusted to leave the original clearance between the thrust washer 33' and the plate 23 when the clutch is fully engaged the entire mechanism is returned to its original condition. The original angle of the links 31 to the axis of the spring 36 is restored, and the force of the spring 36 is also returned to its original value. At the same time the clearance for wear between the plate 23 and thrust washer 33' is restored to permit another period of operation until the clutch facings 18 have again worn down. By reason of this arrangement the maximum gripping pressure on the driving discs 19 and 20 is obtained throughout the life of the clutch facings 18.

It is to be understood that the centering feature for obtaining uniform pressure on the driving discs during engagement and disengagement may be employed with any suitable type of mechanism for exerting pressure on the clutch, and that the arrangement which permits adjustment for wear, while maintaining the original spring force and force multiplication of the toggle elements may be used either with a multiple disc clutch, as shown, or with a single disc. Although the preferred embodiment of the invention has been described in considerable detail, it is to be understood that various re-arrangements and modifications of structural detail may be resorted to without departing from the scope of the invention as defined in the following claims.

I claim:

1. In a clutch, in combination, a driving element including a fixed friction plate and inner and outer movable friction plates, a driven element including a plurality of friction discs, one disc being disposed between said fixed plate and said inner movable plate, and another being disposed between said inner and outer movable plates, and centering means normally maintaining said inner movable plate equally spaced from said fixed plate and said outer movable plate during movement of both of said movable plates.

2. In a clutch, in combination, a driving element including a fixed friction plate and inner and outer movable friction plates, a driven element including a plurality of friction discs, one disc being disposed between said fixed plate and said inner movable plate, and another being disposed between said inner and outer movable plates, and centering means resiliently urging said inner movable plate to a position equally spaced between said fixed plate and said outer movable plate.

3. In a clutch, a driving element including a fixed friction plate and inner and outer movable friction plates, a driven element including a plurality of friction discs arranged alternately with respect to said plates means for exerting a force on said outer plate to grip said discs between said plates and frictionally couple said driving and driven elements, and centering means resiliently urging said inner movable plate to a position equally spaced between said fixed plate and said outer plate, said means being arranged to positively maintain the minimum clearances between said inner plate and each of said other plates equal at all times.

4. In a clutch, a driving element including a fixed friction plate and inner and outer movable friction plates, a driven element including a plurality of friction discs arranged alternately with respect to said plates, means for exerting a force on said outer plate to grip said discs between said plates and frictionally couple said driving and driven elements, opposed beveled surfaces carried by said fixed plate and said outer plate, and a wedging member on said inner movable plate resiliently pressed against said beveled surfaces.

5. In a clutch, a driving element including a fixed friction plate and inner and outer movable friction plates, a driven element including a plurality of friction discs arranged alternately with respect to said plates, means for exerting a force on said outer plate to grip said discs between said plates and frictionally couple said driving and driven elements, aligned pins carried by said fixed plate and said outer movable plate projecting toward each other and terminating in oppositely beveled surfaces, and a wedging member movably carried by said inner movable plate and spring pressed against said beveled surfaces and tending to spread all of said plates.

6. In a clutch, a driving shaft having a fly wheel secured thereto, a plurality of lugs projecting from the surface of said fly wheel, a pair or rings axially slidable toward and away from said fly wheel and held against rotation with respect to said fly wheel by said lugs, a driven shaft co-axially arranged with respect to said driving shaft and having a pair of driving discs slidably keyed thereto, means for exerting pressure on the outer of said movable rings to urge the same toward said fly wheel, aligned pins having conical heads carried by said fly wheel and the outer one of said rings, and a plunger carried by the inner one of said rings and having a head engaging said conical heads, and a spring for urging said plunger radially outward.

7. In a clutch, a driving element including a casing having a front wall and a rear wall and an axially movable plate disposed between said walls, a driven element having a disc arranged to be frictionally engaged by said movable plate, an abutment plate adjustably mounted within and radially overlapping said rear wall and having a central aperture, opposed wedging surfaces on said movable plate and said abutment plate, a sleeve extending through the aperture in said abutment plate and carrying a plurality of radially disposed toggle links having wedges at their outer ends arranged to operate between said opposed wedging surfaces to force said movable plate toward said front wall into frictional engagement with said disc, a spring acting between said sleeve and said abutment plate to urge said sleeve forwardly and move said wedges radially outward, a stop on said sleeve disposed rearwardly of said abutment plate and arranged to engage the latter to prevent movement of said sleeve past the dead centers of said toggle links, whereby adjustment of said abutment plate will simultaneously vary the distance between the same and said movable plate, the position of the abutment for said spring and the position of the abutment for said stop, and a lock member carried by the portion of said rear wall overlapping said abutment plate for locking said abutment plate in a desired adjusted position.

8. In a clutch, in combination, a driving element and a driven element, one of said elements including three relatively movable friction plates, the other of said elements including a pair of friction discs interposed between said three friction plates, means for forcing said three friction plates together to grip said friction discs therebetween, and means operated upon movement of said friction plates for positively maintaining the minimum clearance between each two adjacent surfaces of said plates equal to the minimum clearance between the other adjacent surfaces of said friction plates, whereby all of the adjacent surfaces of said three friction plates move toward or away from each other at the same rate during engagement or disengagement of said friction plates with said friction discs.

9. In a clutch, a driving element including a casing having a front wall and a rear wall and an axially movable plate disposed between said walls, a driven element having a disc arranged to be frictionally engaged by said movable plate, said rear wall having an internally threaded portion and a cylindrical bearing portion spaced from and concentric with said threaded portion, an abutment plate having a cylindrical bearing portion slidably fitting within the bearing portion of said rear wall and having an externally threaded portion engaging the internally threaded portion of said rear wall, said abutment plate having a central aperture, wedge means engaging between said movable plate and said abutment plate for forcing said movable plate toward said front wall, and means extending through the central aperture of said abutment plate for operating said wedge means.

HAROLD D. CHURCH.